(12) United States Patent
Schilling (10) Patent No.: US 10,357,819 B2
(45) Date of Patent: Jul. 23, 2019

(54) INVESTMENT CASTING OF HOLLOW COMPONENTS

(71) Applicant: FLC Flowcastings GmbH, Trebur (DE)

(72) Inventor: Heikko Schilling, Trebur (DE)

(73) Assignee: FLC FLOWCASTINGS GMBH, Trebur (DE)

(*) Notice: Subject to any disclaimer, the term of this patent is extended or adjusted under 35 U.S.C. 154(b) by 0 days.

(21) Appl. No.: 15/028,384

(22) PCT Filed: Oct. 9, 2014

(86) PCT No.: PCT/EP2014/002739
§ 371 (c)(1),
(2) Date: Apr. 8, 2016

(87) PCT Pub. No.: WO2015/051916
PCT Pub. Date: Apr. 16, 2015

(65) Prior Publication Data
US 2016/0256918 A1    Sep. 8, 2016

(30) Foreign Application Priority Data
Oct. 11, 2013   (DE) .................. 10 2013 016 868

(51) Int. Cl.
*B22C 9/10* (2006.01)
*B22C 7/02* (2006.01)
*B22D 29/00* (2006.01)
*B33Y 10/00* (2015.01)
*B33Y 80/00* (2015.01)

(52) U.S. Cl.
CPC .................. *B22C 9/10* (2013.01); *B22C 7/02* (2013.01); *B22C 9/108* (2013.01); *B22D 29/001* (2013.01); *B33Y 10/00* (2014.12); *B33Y 80/00* (2014.12)

(58) Field of Classification Search
CPC .. B22C 7/02; B22C 9/10; B22C 9/108; B22D 29/001
See application file for complete search history.

(56) References Cited

U.S. PATENT DOCUMENTS

| | | |
|---|---|---|
| 5,295,530 A | 3/1994 | O'Connor et al. |
| 5,339,888 A | 8/1994 | Tanner, Jr. |
| 5,465,780 A | 11/1995 | Muntner et al. |
| 5,545,003 A | 8/1996 | O'Connor et al. |
| 5,819,388 A | 10/1998 | Salm |
| 7,302,990 B2 | 10/2007 | Bunker et al. |
| 7,438,527 B2 | 10/2008 | Albert et al. |
| 7,458,411 B2 | 12/2008 | Prigent et al. |
| 8,096,343 B2 | 1/2012 | Whitton |
| 2002/0069996 A1 | 6/2002 | Collins et al. |
| 2007/0039709 A1 | 2/2007 | Endo et al. |

FOREIGN PATENT DOCUMENTS

| | | |
|---|---|---|
| DE | 43-40-646 | 6/1995 |
| DE | 10-2005-021-664 | 12/2005 |
| DE | 10-2007-012-321 | 9/2008 |

(Continued)

*Primary Examiner* — Kevin P Kerns
*Assistant Examiner* — Steven S Ha
(74) *Attorney, Agent, or Firm* — White & Case LLP (57) ABSTRACT

The invention relates to a method for producing a cast component which has cavity structures, using a 3D pattern of digital geometrical coordinates of the cast component by means of a ceramic mold, said method comprising the use of CNC technology.

6 Claims, 4 Drawing Sheets

(56) References Cited

FOREIGN PATENT DOCUMENTS

| | | |
|---|---|---|
| DE | 10-2008-037-534 | 5/2010 |
| EP | 0-655-667 | 5/2000 |
| JP | 2007050444 A | 3/2007 |
| JP | 2007098475 A | 4/2007 |
| WO | WO-2012-024464 | 2/2012 |

INVESTMENT CASTING OF HOLLOW COMPONENTS

FIELD OF THE INVENTION

This invention relates in the field of investment casting to a method for producing a cast component, which has cavity structures, by means of a ceramic mold.

BACKGROUND OF THE INVENTION

Investment casting takes place as is known using a disposable pattern in a disposable mold, which is formed in the shape of a once usable ceramic coating of the pattern. The known method comprises the following steps:
  producing a positive pattern (in the same shape as the cast component to be produced) made of hard or elastic material;
  producing a temporary shape by casting a liquid over the pattern and cooling until it solidifies;
  extracting the pattern;
  forming a temporary pattern by casting a second liquid into the cavity of the temporary mold and cooling until it solidifies;
  melting or loosening of the temporary mold;
  ceramic coating of the temporary pattern in order to form a solid ceramic shell around the temporary pattern;
  melting or loosening of the temporary pattern and evacuating of the thereby accruing liquid from the ceramic shell;
  filling of the cavity of the shell with molten metal and letting it solidify in order to thus form the final cast component.

Most producers of gas turbines work on improved multi-walled and thin-walled gas turbine blades made of superalloys. They have complicated air cooling channels in order to improve the efficiency of the blade inner cooling in order to enable more thrust and to achieve a satisfactory lifespan. U.S. Pat. Nos. 5,295,530 and 5,545,003 are directed at improved multi-walled and thin-walled gas turbine blade designs, which have complicated air cooling channels for this purpose.

The method according to the invention enables the production of all types of high-quality cast components, because it enables, depending on its complexity, the formation of a disposable pattern in a disposable mold, simultaneously averts the break and deformation risk of disposable patterns and avoids needing to use cores, which are susceptible to deformation.

Investment casting is one of the oldest known transformation processes, which was first used thousands of years ago, in order to produce detailed handcrafts made of metal like copper, bronze and gold. Industrial investment casting was used in the 1940s as World War II increased the need for dimensionally accurate components made of specialized metal alloys. Today, investment casting is frequently used in the aviation and energy industry in order to create gas turbine components like blades and conductive surfaces with complex shapes and internal cooling channel geometries.

The production of a gas turbine rotor blade or guide blade from investment casting comprises the production of a ceramic casting mold with an outer ceramic shell with an inner surface, which corresponds with the wing shape, and one or more ceramic cores positioned within the outer ceramic shell, according to the internal cooling channels, which are to be formed within the bearing surface. Molten alloy is casted into the ceramic casting mold, then cools down and hardens. The outer ceramic shell and the ceramic core(s) are then removed through mechanical or chemical means in order to release the casted blade with the external profile mold and the hollow molds of the internal cooling channels (in the shape of the ceramic core(s)).

There is a plurality of techniques for the formation of mold inserts and cores with quite complicated and detailed geometries and dimensions. A just as multifaceted series of techniques is used in order to position and hold the inserts in the molds. The most common technique for holding cores in mold arrangements is the positioning of small ceramic pins, which can be designed as one piece with the mold or the core or both and which protrude from the surface of the mold towards the surface of the core and serve to position or support the core insert. After the casting, the holes in the cast component are filled, for example through welding or the like, preferably with the alloy from which the cast component is formed.

The ceramic core is typically brought into the desired core shape through injection molding, transfer molding or casting of a suitable liquid of ceramic core material. The ceramic core material comprises one or more ceramic powders, a binding agent and optional additives, which are casted into a correspondingly shaped core molding tool.

A ceramic core for injection molding is produced in that first the desired core mold is formed into corresponding casting mold halves made of wear-resistant, hardened steel through precision processing, and the mold halves are then brought together to form an injection volume according to the desired core mold, whereupon the injection of ceramic molding material into the injection volume is pressurized. As already mentioned, the molding material contains a mixture of ceramic powder and binding agent. After the ceramic molding material has hardened into a "green preform", the mold halves are separated in order to release the green preform.

After the green-body mold core has been removed from the mold, it is fired at a high temperature in one or more steps in order to remove the volatile binding agent and to sinter and harden the core and namely for use during the casting of a metallic material like for example a nickel- or cobalt-based superalloy. These are normally used in order to cast a monocrystal gas turbine blade.

During the casting of the hollow gas turbine blades with inner cooling channels, the tired ceramic core is positioned in a ceramic investment casting shell mold in order to form the internal cooling channels in the cast component. The fired ceramic core in the investment casting of hollow blades typically has a flow-optimized contour with an inflow edge and an outflow edge with a thin cross-section. Between these front and rear edge areas, the core can have elongated but also otherwise shaped openings in order to form inner walls, steps, deflections, ribs and similar profiles for delimiting and establishing the cooling channels in the cased turbine blade.

The fired ceramic core is then used during the production of the outer mold shell in the known wax investment casting method, wherein the ceramic core is arranged in a pattern molding tool and a disposable pattern is formed around the core and namely through pressurized injection of pattern material like wax, thermoplast or the like into the mold into the space between the core and the inner walls of the mold.

The complete casting mold made of ceramic is formed by positioning the ceramic core within the two joined halves of another mold made of finished, hardened steel (called a wax pattern mold or wax pattern tool), which defines an injection volume, which corresponds with the desired shape of the blade, in order to then inject melted wax into the wax pattern mold around the ceramic core. Once the wax has hardened, the halves of the wax pattern mold are separated and removed and they free the ceramic core surrounded by a wax pattern, which now corresponds with the blade shape.

The temporary pattern with the ceramic core in it is repeatedly subjected to steps for building up the shell mold on it. For example, the pattern/core subassembly is repeatedly dipped into the ceramic slurry, excess slurry is allowed to flow off, sanded with ceramic stucco and then air-dried in order to build up several ceramic layers, which form the mold shell on the arrangement. The resulting surrounded pattern/core arrangement is then subjected to the step of removing the pattern for example via steam autoclave in order to eliminate in a targeted manner the temporary or disposable pattern so that the mold shell with the ceramic core arranged in it remains. The mold shell is then fired at a high temperature in order to establish an appropriate stability of the mold shell for the cast metal.

A molten metallic material like a nickel- or cobalt-based superalloy is casted and solidified in the preheated shell mold in order to create a cast component with a polycrystalline or monocrystalline grain. The resulting casted blade still contains the ceramic core in order to thus form the internal cooling channels after removing the core. The core can be removed through flushing or other conventional techniques. The hollow, casted, metallic flow profile cast component is created.

This known investment casting method is expensive and time-consuming. Many months and hundreds of thousands of dollars of investment are typically associated with the development of a new blade design. Moreover, design decisions are limited by process-related limitations during the production of ceramic cores for example due to their fragility as well as due to the time-consuming production for detailed or large cores. The metal-processing industry recognized these limits and developed at least a few gradual improvements like for example the improved method for casting cooling channels on a blade outflow edge in U.S. Pat. No. 7,438,527. But, since the market demands continuously increasing efficiency and performance of gas turbines, the limits of the existing investment casting processes are becoming increasingly problematic.

Investment casting techniques are susceptible to a series of imprecisions. While imprecisions on the outer contour can often be corrected with conventional production techniques, those on the internal structural molds of cores are difficult and often even impossible to eliminate.

Internal imprecisions result from known factors. These are generally imprecisions during the production of the core structure, imprecisions during the coating of the core in the wax tool during production, installation of the mold, unexpected changes or defects from fatigue of the ceramic molds and failure of the shell, the core or the fastening elements during production, installation and handling before or during the casting process.

The exact design, dimensioning and position of the core insert became the biggest problem in the production of molds. These aspects of the investment casting underlie the invention although the method of the present invention can also be used in other technology.

The production of casting mold and core are typically limited in the possibility of reliably forming fine details with sufficient resolution. In terms of the accuracy of the positioning, reliable dimensions and the creation of complex and detailed molds, the known systems are very limited.

The core inserts are generally mold parts, produced using conventional injection molding or molds of ceramic, followed by suitable firing techniques. It is in the nature of the ceramic cores that the accuracy is considerably less than that achievable in metal casting processes. There is much greater shrinkage in the conventional ceramic casting compounds or faults like a much greater tendency towards the formation of cracks, bubbles and other defects. There is thus a high fault and scrap rate, which results from uncorrectable deficiencies, caused by faulty cores and core positioning. Or at least considerable effort is required during reworking in order to correct the cast components lying outside the tolerances if they are even accessible for correction through post-processing, sanding or the like. The productivity and efficiency of the investment casting method are mainly restricted by these limitations.

A further limiting aspect of investment casting was also always the extensive lead time for the development of the molding tools normally from metal for the cores and the temporary pattern as well as the associated considerably effort. The development of the individual phases of the molding tool, including in particular the geometry and the dimensions of the wax molds, the geometry and dimension of the green body and the final geometry of the fired molds, in particular the cores, and the resulting configuration and dimensioning of the cast component produced in these molding tools are dependent on a plurality of variables, including warping, shrinkage and crack formation during the different production steps and in particular during the firing of the ceramic green body. As is well known to a person skilled in the field, these parameters are not exactly predictable, and the development of the investment casting molds is a highly iterative and empirical process of trial and error, which extends over a period of 20 to 50 weeks for complex cast components, before the process can be put into operation.

This results in that complex investment casting of cavities is limited in particular to the production of individual parts and casting in a significant number is generally not possible due to limited number of cycles of the method and its elements, in particular the molding tools. Changes in the design of the cast components require tool post-processing to an appropriate extent and are thus very expensive and time-consuming.

The prior art paid attention to these problems and has made progress in the use of improved ceramic compounds, which reduce the occurrence of such problems to a certain degree.

Although these techniques have led to improvements, they are at the expense of the costs of the casting process and yet do not achieve all desired improvements.

In the case of those techniques that comprise an impact on the green bodies and in particular a mechanical processing of the green bodies, experience has shown that the changes in the dimension during the firing of the ceramic bodies then still cause a series of imprecisions, which limit the realization of the sought geometry and dimensions of the fired bodies. Due to the fragility of the green preforms, the techniques that can be use are limited and considerable manual work is generally required. Even with the best precautionary measures and the greatest care, a considerable portion of the cores are finally destroyed by the work processes.

However, particularly disadvantageously, the attempts of the prior art even in its latest state do little to improve the cycle time of the molding tool development or to reduce the number of necessary iterations needed to produce the final molding tools in the required accuracy of the mold and dimensions. The prior art provides no effective techniques for reworking the shape of the shell and cores, which lie outside of the specifications, or in order to change the molds for design changes without restarting the molding tool development process.

Additional prior art comprises the milling of waxes especially in dental applications, but for which there is no direct application in investment casting.

SUMMARY OF THE INVENTION

An object of the invention is to provide a method for producing investment casting molds and in particular mold cores with a high and improved reproducibility, dimensional stability and accuracy.

This object is solved by a method with the characteristics of claim 1. Preferred designs are specified in the dependent claims.

An advantage achieved with the invention is to avoid the use of a tool, which was previously required for the injection of wax patterns and cores, and thus to reduce the tool development cycle time for producing investment casting molds and cores with a high accuracy and complex geometry.

A further advantage of the method according to the invention is being able to quickly change the geometry and the dimensions of the investment casting molds and cores in order make them available for construction changes without thereby repeating the tool development cycle.

The present invention relates to a method for producing a cast component which has cavity structures, using a three-dimensional (3D) pattern of digital geometrical coordinates of the cast component in investment casting by means of a ceramic mold, said method comprising the following steps:
  a) (at first optionally) adaptation of the geometry in the 3D pattern of the core for producing the cavity structures for a first (preferably at least in its last step non-casting-technical) CNC production method of the core;
  b) computer numerical controlled (CNC) production of a core according to the 3D pattern in the first CNC production method (preferably through milling or in a generative production method like for example 3D printing, selective laser melting or sintering);
  c) positioning the core in a treatment support;
  d) casting the pattern material (preferably modeling wax) around the core in a volume that is larger than the cast component (preferably on all sides beyond the cast component cubature, which according to the 3D pattern is spatially defined by the position of the core in the treatment support) and allowing the pattern material to solidify;
  e) producing an outer contour of a temporary (disposable) pattern of the cast component from the solidified pattern material around the core according to the 3D pattern by CNC technology in a (preferably at least in its last step non-casting-technical) second CNC production method (for example machined, preferably through milling);
  f) applying a ceramic mold shell (preferably made of high-temperature-resistant ceramic) to the outer contour of the disposable pattern and forming a positioning connection of the ceramic mold and the treatment support;
  g) melting the disposable pattern from the ceramic mold around the core in the treatment support;
  h) sintering the ceramic casting mold;
  i) casting molten metal into the ceramic mold around the core in the treatment support;
  j) allowing the molten metal to solidify to the solid cast component and
  k) removing the ceramic mold and the core from the cast component.

Also the production according to the invention for example of a gas turbine blade from investment casting comprises the production of a ceramic casting mold with an outer ceramic shell with an inner surface, which corresponds with the contour of the gas turbine blade, and one or more ceramic cores positioned within the outer ceramic shell, according to the internal cooling channels, which are to be formed within the bearing surface. Molten alloy is poured into the ceramic casting mold, then cools down and hardens. The outer ceramic shell and the ceramic core(s) are then removed through mechanical or chemical means in order to release the cast blade with the external profile shape and the hollow molds of the internal cooling channels (in the shape of the ceramic core(s)).

However, according to the invention, the ceramic core is produced using computer numerical control (CNC) and namely as a negative mold or complementary mold of cavity structures according to the 3D pattern of the cast component to be produced. In this first CNC production method of step a), milling and/or a generative production method like for example 3D printing, selective laser melting or sintering can be used.

The 3D model can be previously adapted in the optional first step by means of CAD so that it is suitable, in particular dimensioned, for the investment casting and in particular also for the CNC production.

In the CNC method (in step a) and/or d)) according to the invention, the commands for controlling a performing machine tool are created according to at least one section of the 3D pattern of the core and/or of the pattern.

In step a), the at least one mold core insert is formed with high and reproducible accuracy according to the invention for example also through casting of a blank of the core insert made of ceramic, firing of the ceramic and final processing of the core element using one or more processing techniques like for example milling.

The core insert can be machined from a block of presintered or sinter ceramic with uniform porosity, wherein shrinkage during the subsequent processing and handling is even allowed because it is predictable. It is namely possible to produce blocks of presintered or sinter ceramic with very uniform and very predictable shrinkage. This enables more accurate casting with respect to conventionally produced cores (the porosity and shrinking properties of which vary considerably).

The surfaces of the cores can be coated after the processing in order to produce a smooth mold surface for the casting. The surface of the ceramic forms a correspondingly smooth surface of the cast component to be casted in the mold.

In step b), one or more processed core inserts are positioned in a treatment support preferably designed adapted to it in order to guarantee the overall highest component dimensional stability especially also between the core and outer contour. For the treatment support also serves as the basis for the determination of at least one reference point between the core geometry and the subsequent highly precise CNC molding of the outer contour of the disposable pattern, for example the CNC milling of the wax block in step d).

After the last core has been milled in step a) for example on a 5-axis CNC milling machine, the pattern material is casted in particular in a temperature-controlled manner into the support into a volume in step c) and forms during solidification a pattern material block with the one or more core inserts in its interior. The volume preferably protrudes on all sides over the cast component cubature according to the 3D pattern. According to the 3D pattern, the cast component cubature is spatially determined by the position of the core in the treatment support.

The named treatment support including the pattern material block is then positioned for example in a CNC 5-axis milling machine in order to guarantee the highest processing accuracy even during the then occurring milling of the outer contour of the disposable wax model. The pattern material block can be processed in the CNC machine tool according to component-constructive requirements according to the highest surface quality and dimensional accuracy. The positional accuracy of this processing in step d) with respect to the core can already be guaranteed by fitting and positioning measures that are conventional in mechanical engineering during the clamping of the core in the treatment support and of the treatment support in the CNC machine tool. Alternatively or cumulatively, a reference positioning geometry can also be applied to the core (and/or the treatment support), which is now triggered in particular before step d) by the CNC machine tool in order to orient and/or to control the CNC machine tool commands to it.

The complete casting mold made of ceramic is thus formed as follows: By positioning the ceramic core within the volume mold for the pattern material and casting pattern material like for example wax into it, a blank of the disposable mold is created after its hardening. Once the wax has hardened, the outer contour of the cast component (approximately the shape of the turbine element) is preferably milled in the CNC method. This disposable pattern with the ceramic core in it is now repeatedly subjected to steps for building up the shell mold on it. For example, the pattern/core subassembly is repeatedly dipped into the ceramic slurry, excess slurry is allowed to flow off, moistened with ceramic stucco or sand and then air-dried in order to build up several ceramic layers, which form the mold shell on the arrangement. The resulting surrounded pattern/core arrangement is then subjected to the step of removing the pattern for example via steam autoclave in order to eliminate in a targeted manner the temporary or disposable pattern so that the mold shell with the ceramic core arranged in it remains. The mold shell is then fired at a high temperature in order to establish an appropriate stability of the mold shell for the cast metal.

Liquid metallic material like a nickel- or cobalt-based superalloy is casted and solidified in the preheated shell mold in order to create a cast component with a coaxial or directionally solidified polycrystalline grain or as a monocrystal. The resulting casted blade still contains the ceramic core in order to thus form the internal cooling channels after removing the core. The core can be removed by flushing or other conventional techniques. The hollow casted metallic cast component is created according to the invention.

One of the greatest advantages of the method of the present invention is the reduction in the throughput time for producing mold parts and the acceleration of the development process of the molds. The iterative process of the development that has been conventional up until now is greatly reduced or even avoided according to the invention because it is not necessary to achieve in particular a final "net" mold taking into consideration subsequent mold design processes in the ceramic casting mold technology, such as for example shrinking and contraction. Since the final mold can be produced directly, the production according to the invention of investment casting pieces of the desired shape and dimensions is no long difficult and time-consuming in that above all trial-and-error method grinding can be avoided as required in the prior art.

These and additional advantages and characteristics of the invention are described in greater detail below based on the following illustrations of an exemplary embodiment of the invention.

BRIEF DESCRIPTION OF THE FIGURES

The drawings show in FIG. 1 to 7 schematic views of consecutive steps of the method according to the invention for producing a cast component, which has cavity structures.

DETAILED DESCRIPTION OF THE INVENTION

Figure 1:
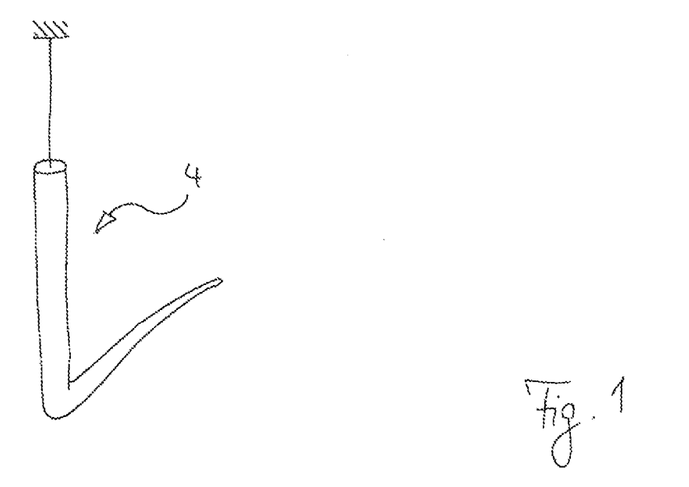

Using a 3D pattern with digital geometry coordinates (not shown) of a cast component 2 (FIG. 7), according to FIG. 1 in an initial method step, a core 4 is produced according to the 3D pattern in a first CNC production method, namely through CNC milling (not shown).

Figure 2:
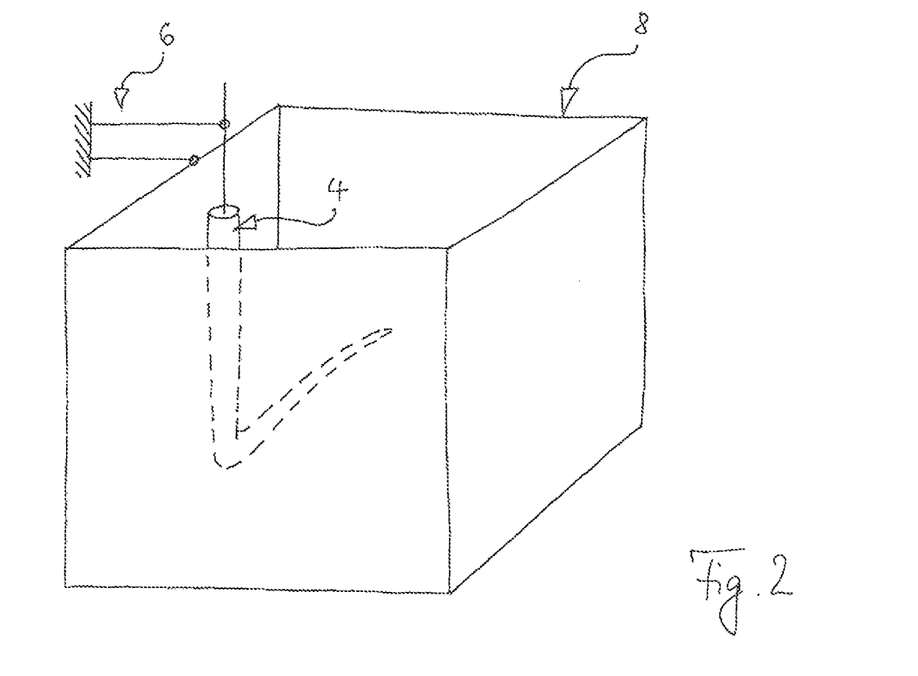

According to FIG. 2, in a next method step, the core 4 is positioned in a treatment support 6. A volume 8 is arranged around the core and also positioned and fastened in the treatment support 6.

Figure 3:
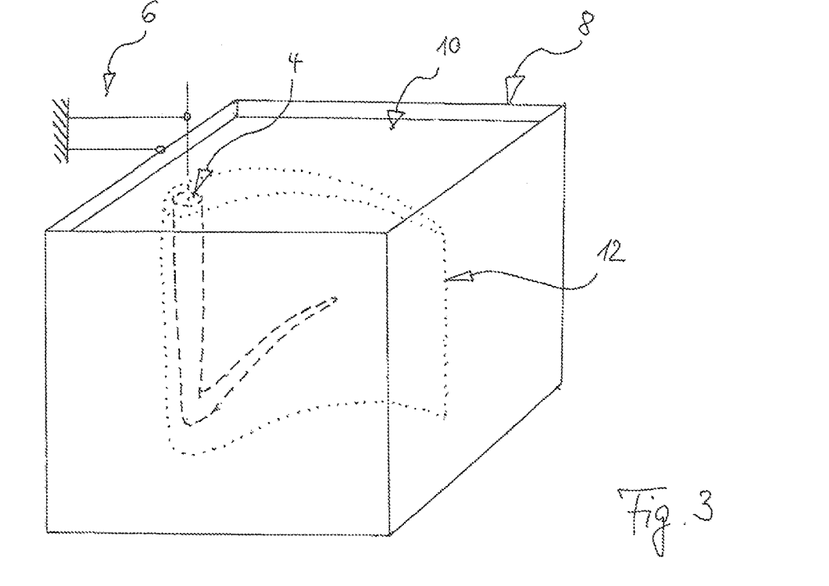

According to FIG. 3, in a next method step, modeling wax 10 is casted around the core 4 into the volume 8. The volume 8 is larger than the cast component cubature 12 and the modeling wax 10 is casted around the core 4 on all sides up to over the cast component cubature 12 into the volume 8. According to the 3D pattern (not shown) of the cast component part 2 (FIG. 7), the spatial position of the cast component cubature 12 is determined by the position of the core 4 in the treatment support 6.

Figure 4:
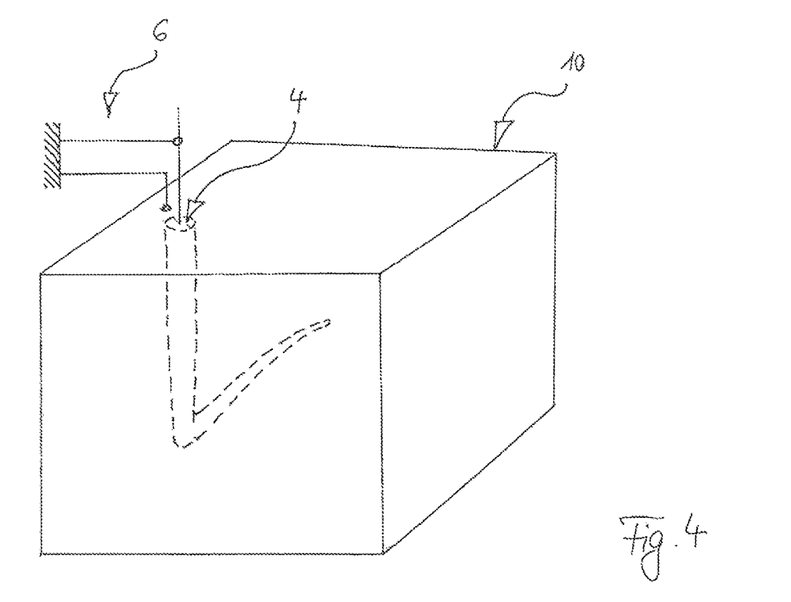

According to FIG. 4, in a next method step, the pattern material 10 is now let to solidify around the core 4 and the volume 8 is removed.

Figure 5:
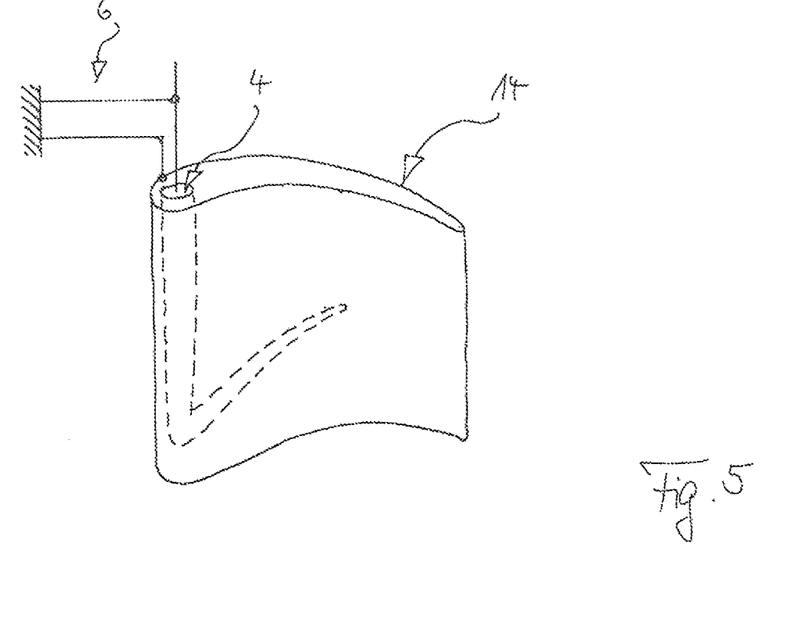

According to FIG. 5, in a next method step, the outer contour of a temporary (disposable) pattern 14 of the cast component 2 (FIG. 7) is produced around the core 4, and namely from the solidified pattern material 10 according to the 3D pattern (not shown) in a second CNC production method, namely in turn through CNC milling (not shown).

Figure 6:
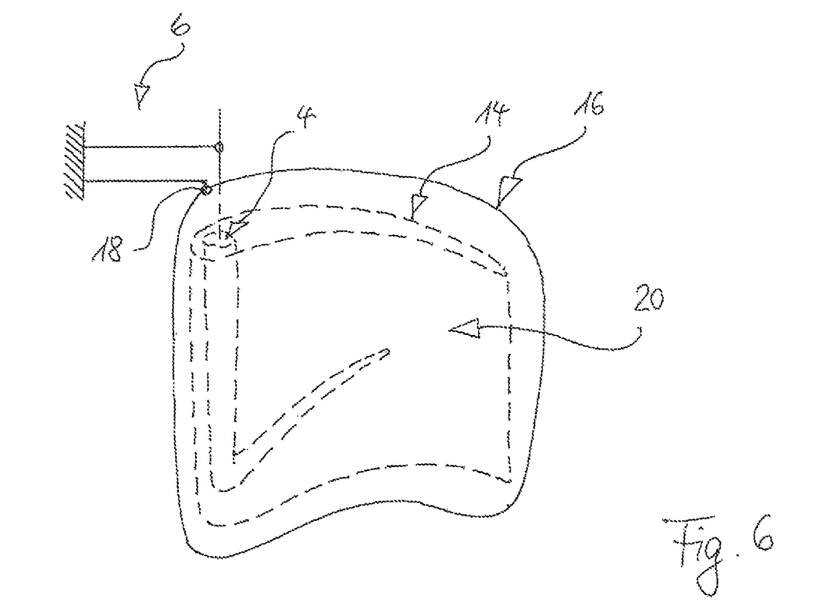

According to FIG. 6, in a second method step, a ceramic mold 16 is applied to the outer contour of the disposable pattern 14 and a positioning connection 18 of the ceramic mold 16 and the treatment support 6 is thereby formed so that the ceramic mold 16 is positioned dimensionally accurately with respect to the core 4 according to the 3D pattern (not shown) of the cast component 2 (FIG. 7) by the treatment support 6. In a next method step, the disposable pattern 14 made of the ceramic mold 16 around the core 4 (both of which continue to be held and position by the treatment support 6) is removed. A hollow mold 20 is created between the surface of the ceramic core 4 and the interior 14 of the ceramic mold 16. In a next method step, molten metal (not shown) is casted inside. In a next method step, it is left to cool.

Figure 7:
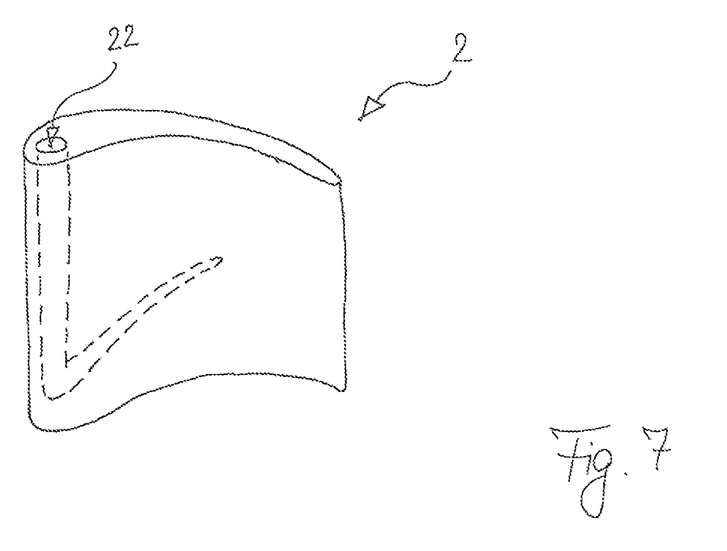

The molten metal (not shown) solidifies into the solid cast component 2, which, according to FIG. 7 in a next method step, will become visible through removal of the ceramic mold 16 and the core 4 from the cast component 2 and is thus available as a component with the core 4 of the corresponding cavity structure 22 with great dimensional accuracy.

The invention claimed is:

1. A method for producing a solid cast component, which has cavity structures, using a ceramic mold and a 3D pattern of digital geometrical coordinates of the solid cast component, said method comprising the following steps:
   a) producing a core according to the 3D pattern by CNC technology in a first CNC production method;
   b) positioning the core in a treatment support by determining, based on the 3D pattern and a position of the core in the treatment support, a cubature of the solid cast component and an outer contour of a disposable pattern, positioning a volume according to the position of the core, such that the volume protrudes on all sides over the cubature of the solid cast component, and fastening the core and the volume to the treatment support;
   c) casting a pattern material around the core in the volume that is larger than the cubature of the solid cast component, which according to the 3D pattern is spatially defined by the position of the core in the treatment support, and allowing the pattern material to solidify;
   d) producing, using CNC technology in a second CNC production method, the outer contour of the disposable pattern of the solid cast component from the solidified pattern material around the core which is spatially fixed according to the 3D pattern by the position of the core in the treatment support;
   e) applying a ceramic mold to the outer contour of the disposable pattern and forming a positioning connection of the ceramic mold and the treatment support;
   f) removing the disposable pattern from the ceramic mold around the core in the treatment support;
   g) casting metal into the ceramic mold around the core in the treatment support;
   h) allowing the molten metal to solidify into the solid cast component; and
   i) removing the ceramic mold and the core from the solid cast component.

2. The method according to claim 1, further comprising the following step before step a):
   adaptation of the geometry in the 3D pattern of a core for producing the cavity structures of the core for the first CNC production method in step a).

3. The method according to claim 1, wherein in step a), the first CNC production method is one of CNC milling and a generative production method.

4. The method according to claim 3, wherein first CNC production method is one of 3D printing, selective laser melting, and sintering.

5. The method according to claim 1, wherein in step b), the second CNC production method is a machined method.

6. The method according to claim 5, wherein the second CNC production method is CNC milling.

* * * * *